(12) United States Patent
Tjellesen et al.

(10) Patent No.: US 9,738,035 B2
(45) Date of Patent: Aug. 22, 2017

(54) POWER FEED MECHANISM FOR A THREE-DIMENSIONAL PRINTER

(71) Applicant: Hewlett-Packard Development Company, L.P., Houston, TX (US)

(72) Inventors: Frederik Walsted Tjellesen, Copenhagen N (DK); Anders Ørnsholt Hartmann, Copenhagen N (DK)

(73) Assignee: Hewlett-Packard Development Company, L.P., Houston, TX (US)

( * ) Notice: Subject to any disclaimer, the term of this patent is extended or adjusted under 35 U.S.C. 154(b) by 151 days.

(21) Appl. No.: 14/428,939

(22) PCT Filed: Sep. 17, 2013

(86) PCT No.: PCT/EP2013/069275
§ 371 (c)(1),
(2) Date: Mar. 17, 2015

(87) PCT Pub. No.: WO2014/044676
PCT Pub. Date: Mar. 27, 2014

(65) Prior Publication Data
US 2015/0224712 A1 Aug. 13, 2015

(30) Foreign Application Priority Data
Sep. 18, 2012 (GB) .................................. 1216636.9

(51) Int. Cl.
*B29C 67/00* (2017.01)
*B22F 3/00* (2006.01)
*B65G 47/16* (2006.01)
*B33Y 30/00* (2015.01)
*B33Y 40/00* (2015.01)

(52) U.S. Cl.
CPC .......... *B29C 67/0085* (2013.01); *B22F 3/003* (2013.01); *B22F 3/005* (2013.01);
(Continued)

(58) Field of Classification Search
CPC ............ B29C 67/0085; B29C 67/0077; B29C 67/0074; B33Y 40/00; B33Y 30/00;
(Continued)

(56) References Cited

U.S. PATENT DOCUMENTS 3,383,020 A * 5/1968 Cargile ............... F42B 33/0292
222/168
4,522,543 A * 6/1985 Robinson ............... A47G 21/08
222/342
2004/0170765 A1* 9/2004 Ederer .................. B05C 11/023
427/355
(Continued)

FOREIGN PATENT DOCUMENTS

DK  WO 2011045291 A1 *  4/2011  ......... B29C 67/0062
EP            1439050 A1         7/2004
(Continued)

*Primary Examiner* — Alison L Hindenlang
*Assistant Examiner* — Jerzi H Moreno Hernandez
(74) *Attorney, Agent, or Firm* — HP Inc.—Patent Department (57) ABSTRACT

A powder feed mechanism for a three-dimensional printer in which a heap of powder is drawn up from a powder container to be spread across a material bed rather than dropped or deposited on it. The mechanism comprises a carrier arm that moves through a powder chamber, and a support platform for carrying a heap of powdered build material. The support platform moves with the carrier arm. The carrier arm moves to a powder delivery position in which the support platform is in a transverse orientation for lying flush with the material bed. This arrangement can reduce the path travelled by the powder from the powder chamber to the material bed and give greater control over the shape of the heap of powder that is to be spread over the material bed.

12 Claims, 5 Drawing Sheets

(52) U.S. Cl.
CPC .......... *B29C 67/0077* (2013.01); *B33Y 30/00* (2014.12); *B65G 47/16* (2013.01); *B33Y 40/00* (2014.12)

(58) Field of Classification Search
CPC ............ B22F 3/1055; B22F 2003/1056; B22F 3/005; B22F 3/003; B05C 19/06; B65G 47/16
See application file for complete search history.

(56) References Cited

U.S. PATENT DOCUMENTS

| | | | | |
|---|---|---|---|---|
| 2004/0224173 A1* | 11/2004 | Boyd | .................. | B29C 67/0074 428/500 |
| 2007/0298182 A1* | 12/2007 | Perret | .................. | B22F 3/1055 427/427.3 |
| 2008/0230414 A1* | 9/2008 | Perret | ................. | B29C 67/0077 206/349 |
| 2009/0321979 A1* | 12/2009 | Hiraide | ............... | B29C 67/0074 264/113 |
| 2012/0201960 A1* | 8/2012 | Hartmann | ........... | B29C 67/0062 427/256 |
| 2013/0168902 A1* | 7/2013 | Herzog | ................. | B22F 3/1055 264/401 |

FOREIGN PATENT DOCUMENTS

| | | |
|---|---|---|
| EP | 2399695 A1 | 12/2011 |
| EP | 2450177 A1 | 5/2012 |
| WO | WO 2004/056512 | 7/2004 |
| WO | WO 2011/045291 | 4/2011 |

* cited by examiner

POWER FEED MECHANISM FOR A THREE-DIMENSIONAL PRINTER

CROSS-REFERENCE TO RELATED APPLICATIONS

This application is a U.S. National Stage Application under 35 U.S.C. §371 of International Patent Application No. PCT/EP2013/069275, filed Sep. 17, 2013, which claims priority to Great Britain Patent Application No. 1216636.9, filed Sep. 18, 2012, the contents of each of which are incorporated by reference in their entireties.

FIELD OF THE INVENTION

The invention relates to a powder feed mechanism for a three-dimensional printer, e.g. suitable for use as rapid prototyping apparatus, in which a three-dimensional model is built by successive deposition of a plurality of layers.

BACKGROUND TO THE INVENTION

There are many different technologies currently used to build physical three-dimensional models using additive manufacturing technology, e.g. building a model layer by layer. Typically, a virtual design of the three-dimensional model, e.g. represented through computer-aided design (CAD) software or the like, is transformed into a plurality of thin (quasi-two-dimensional) cross-sectional layers which are built on one another in succession.

There are a number of known ways in which the cross-sectional layers may be formed. For example, it is known to sinter a selected sub-region of a deposited area of green material, e.g. by guiding a laser beam over the sub-region. Such an arrangement is disclosed in WO 2004/056512. Another example involves the use of a two-dimensional heat or light source arranged to melt or cure all of a selected sub-region at the same time by masking out the areas not to be melted. Such an arrangement is disclosed in US 2002/0149137.

WO 2011/045291 discloses a three-dimensional printer in which a three-dimensional model is built by sequential deposition of a plurality of cross-sectional layers by using a thermal print head movable relative to a material bed. This device is suited for use with flowable build material, such as polyamide powder. To create the layer of powder to be treated with the thermal print head, a heap of powder is deposited at one end of the material bed and spread over the material bed by a suitable platform and compacted by a pressure plate or the like.

US 2010/0151136 discloses another three-dimensional printer in which models are built by the heat treatment of sequential layers of powdered build material. In this case, the powder for each layer is transported from a build powder container to the material bed on a slat. The slat in attached to a conveyor belt which moves it on a path through the build powder container, where it collects the powder, to the material bed. The conveyor belt is then arranged to upend the slat at the material bed to deposit the collected powder in a heap to be spread into the layer before the printing process begins.

EP 2 450 177 discloses a further example of a three-dimensional printer in which models are built by the heat treatment of sequential layers of powdered build material. In this case, the powder for each layer is transported pneumatically from a powder chamber to a dispensing hopper, from where it can be deposited in a heap on the material bed and spread into a layer in a conventional manner.

SUMMARY OF THE INVENTION

At its most general, the present invention provides a powder feed mechanism for a three-dimensional printer in which a heap of powder is drawn up from a powder container to be spread across the material bed rather than dropped or deposited on it. This arrangement may both enable the path travelled by the powder from the powder chamber to the material bed to be reduced or minimised and give greater control over the shape of the heap of powder that is to be spread over the material bed. Moreover, this arrangement enables the powder container and powder feed mechanism to be located in the base of the printer, which means it does not impinge on the space above the material bed that may be used by the printing mechanism. Herein, a three-dimensional printer is intended to mean a printer for building a three-dimensional model by sequential deposition of a plurality of cross-sectional layers of that model. References to a heap of powder may mean an elongate pile of build material having a volume greater than or equal to that required to provide a build layer covering the material bed and a height greater than (e.g. 10 or more times greater than) the normal height of a build layer on the material bed.

According to the invention, there is provided a powder feed mechanism for transporting powdered build material from a powder chamber to a material bed of a three dimensional printer, the powder feed mechanism comprising: a carrier arm arranged to move through the powder chamber between a powder capture position and a powder delivery position; a support platform having a powder support surface for carrying a heap of powdered build material, the support platform being attached to the carrier arm to move therewith along a path through the powder chamber as the carrier arm moves between the powder capture position and a powder delivery position, wherein, when the carrier arm is in the powder delivery position, the powder support surface of the support platform is in a transverse orientation for lying flush with the material bed, and wherein the carrier arm is pivotably mounted over the powder chamber to swing back and forth through the powder container during the upstroke and downstroke movements. The carrier arm and support platform may thus act to scoop powder from the powder chamber and bring it to the same level as the material bed.

The support platform may thus move in an arc-shaped path through the powder chamber. Alternatively, the carrier arm may be movably mounted in slots formed in the side walls of the powder chamber, the shape of the slots defining the path of movement for the carrier arm during the upstroke and downstroke movements. In another embodiment, the carrier arm may be mounted on a four bar mechanism arranged to draw it back and forth through the powder container during the upstroke and downstroke movements.

The powder support surface may be concave to assist in holding the powder. Alternatively, the powder support surface may be flat. Using a flat surface on the support platform may enable all of the carried powder to be accessible to a spreading device, such as a horizontally moving roller or spreading blade, which pushes the carried powder over the material bed itself. This may minimise the amount of powder remaining on the support platform.

The carrier arm may comprise a pair of struts which are spaced apart and fixed at one end to a rotatable shaft. The struts may project parallel to each other in a direction substantially orthogonal to the axis of rotation of the shaft. The rotatable shaft may be mounted over the powder chamber, such that in the powder capture position the pair of struts extend substantially downwardly into the powder chamber, and in the powder delivery position the pair of struts extend substantially horizontally towards the material bed. The struts may have a thin cross-section facing the direction of movement back and forth through the powder chamber. The resistance exerted by powder in the powder chamber against the struts during movement can therefore be reduced or minimised.

The rotatable shaft may be connected to a suitable rotation drive, such an a DC gear motor or the like, which is arranged to swing the carrier arm back and forth through the powder chamber. A locking mechanism, which may be part of the rotation drive, may be arranged to secure the carrier arm in the powder delivery position.

The support platform is connected to span between the end of the pair of struts opposite to the end attached to the rotatable shaft. The carrier arm may thus act to push the support platform through powder in the powder chamber as it moves from the powder capture position to the powder delivery position. As the carrier arm swings between these positions, the orientation of the powder support surface of the support platform may be brought from a substantially vertical orientation to the transverse orientation it occupies when the carrier arm is in the powder delivery position. The powder support surface may therefore be substantially orthogonal to the direction of travel of the support platform throughout the upstroke of the carrier arm, which facilitates the efficient collection of powder.

In one embodiment, the support platform may comprise means for heating the powder support surface of the support platform, such as one or more resistive heat elements mounted under the powder support surface. The heat may pass by conduction into powder held on the support platform, so this arrangement may be used as a way to preheat the powder on the powder support surface without affecting the other powder in the powder chamber, which can assist with the subsequent printing process.

The powder chamber for holding the powder may itself be part of the powder feed mechanism. The powder chamber may be mounted adjacent to a side of the material bed to minimise the distance that powder needs to be moved before it is spread over the material bed. The powder chamber may include a front wall for locating adjacent the material bed, the front wall having a top edge for alignment with the top of the material bed. The carrier arm may thus be arranged to locate the support platform at the top edge of the powder chamber when it is in the powder delivery position. The top edge of the front wall may have a lip for abutting the support platform when the carrier arm is in the powder delivery position. The lip may overhang into the building container. This may have the effect of ensuring that there is an unbroken line of contact between the support platform and top edge and. Having an unbroken line of contact can limit powder loss during the subsequent spreading operation. Additionally or alternatively, the support platform may comprise a flexible web along its distal edge (the edge closer to the material bed) for the same reason. The flexible web is arranged to abut the top edge of the front wall or the lip when the carrier arm is in the powder delivery position, where it may provide an line of unbroken contact or seal.

The powder chamber may also include a bottom surface that is shaped to follow the path of the support platform towards the top edge of the front wall. For example, the bottom surface may be curved to follow the arc-shaped path of the support platform. The bottom surface may thus act as a guide for the support platform. In one embodiment, the bottom surface may comprise a lower section shaped to contact the support platform during a first portion of its movement along the arc-like path, and an upper section shaped to be spaced from the support platform during a second portion of its movement along the arc-like path. The contact between the support platform and bottom surface in the lower section may assist in the collection of powder, because powder cannot escape under the powder support surface of the support platform during this stage of the movement. This arrangement may thus ensure that a suitable mass of powder is collected on the support platform. The upper section, on the other hand, may allow any excess powder to run off the support platform. In combination these features may assist repeatable collection of a suitable heap of powdered material. The size of the heap may also depend on the width of the powder support surface of the support platform. This width may be selected in advance to ensure that the correct volume of powder is collected. Other controllable factors which affect the size of the heap may include the flowability of the powder and the speed at which the powder support surface passes through the upper section of the bottom surface of the powder chamber.

In practice, the heap of powdered material may contain more powder than is necessary to create a layer on the material bed. The material bed may have an additional powder container on the opposite side of the material bed from the powder chamber in order to collect any powder left over from the spreading operation. As explained in more detail below, the additional powder container may itself be a powder chamber for a second powder feed mechanism that is arranged to feed a heap of powdered material up to the other side of the material bed. When used with a bi-directional print mechanism, this arrangement can substantially increase the printing speed and can improve the quality of printing because heat is applied from both sides of the material bed.

The support platform may be pivotally attached to the carrier arm, whereby the orientation of the powder support surface is rotatable between a transverse position and an angled position. The purpose of this function is to allow the support platform to adopt a different position during the downstroke of the carrier arm, i.e. from the powder delivery position to the powder capture position. Changing the orientation may reduce the surface area presented to the powder, which may assist in a rapid return to the powder capture position.

To ensure that the pivotal connection does not adversely affect the upstroke of the carrier arm, a limited pivotal connection between the carrier arm and support platform may be provided. The limited pivotal connection may permit the support platform to swing up from a predetermined rest position. During the downstroke of the carrier arm, the support platform may be brought into contact with powder in the powder chamber. The powder will resist motion of the support platform, which will therefore swing back relative to the carrier arm as it continues its movement through the powder chamber. The support platform will meanwhile tend to align in an orientation of least resistance against the powder.

The backstroke of the carrier arm may continue beyond the powder capture position to enable the support platform to be returned to its original position.

The limited pivotal connection may comprise a rotation stop arranged to restrict rotation of the orientation of the support platform away from the transverse position during an upstroke movement of the carrier arm from the powder capture position to the powder delivery position. The rotation stop thus resists backward motion of the support platform as it is pushed through the powder. The powdered material may thus be pushed ahead of the support platform, whereby it is collected on the powder support surface. In practice, the powder chamber is filled with powdered build material up to a fill level. The support platform is preferably wholly below the fill level when the carrier arm is in the powder capture position. Preferably, the fill level is arranged at a height that ensures the powder covers the lower section of the bottom surface of the powder chamber. The powder support surface may therefore be fully in contact with powder whilst it moves against the bottom surface during the upstroke movement.

In one embodiment, the support platform may be mounted at the end of a carrier finger, the carrier finger being mounted on the carrier arm at a pivot joint. In this embodiment, the rotation stop may comprise an abutment element on the carrier arm, the abutment element being arranged to engage the carrier finger to prevent pivoting beyond a predetermined position, e.g. to prevent back pivoting from the transverse position but to allow forward pivoting from the transverse position during the downstroke movement.

The powder feed mechanism may comprise a powder manipulator arranged to disturb the powder in the powder chamber behind the support platform when the carrier arm is in the powder capture position. The powder manipulator may thus encourage powder in a "dead zone" that is out of reach of the support platform to fall forwards in the powder chamber to a position where it can be captured. The powder manipulator may be a movable wire or wedge arranged to pass through the "dead zone", where it can stir up the powder. The powder manipulator may be mounted on the carrier arm behind the support platform in the upstroke direction, whereby it projects into the "dead zone" when the carrier arm is in the powder capture position. The powder manipulator may comprise one or more taut wires spanning between the struts of the carrier arm. Alternatively, the powder manipulator may be a strip of rigid material having a wedge-shaped cross-section.

The powder manipulator mounted on the carrier may also function to facilitate passage of the support platform through the powder during the downstroke movement by lowering the force needed to move support platform downward through the powder.

The powder manipulator may include laterally protruding elements which extend beyond the sides of the carrier arm. This arrangement may allow the powder feed mechanism to be used in a powder chamber that is wider that the width of the support platform. The laterally protruding elements may comprise one or more rods one each side of the carrier arm projecting e.g. parallel to the support platform and orthogonal to the struts. These rod may act to stimulate movement of powder toward the centre of the powder chamber.

If the powder chamber is wider than the support platform, the bottom surface of the powder chamber may be angled towards the centre to encourage the powder to move inwards.

The powder feed mechanism of the invention may be part of a printer for building a three-dimensional model by sequential deposition of a plurality of cross-sectional layers, the printer also comprising: a material bed; a powder chamber for holding build powder; and a powder spreading mechanism for spreading the heap of powder into a layer over the material bed.

In one embodiment, the powder spreading mechanism may be operable in both directions between a first side of the material bed and a second side of the material bed opposite to the first side. In this embodiment a first powder feed mechanism according to the invention may be provided at the first side of the material bed, and a second powder feed mechanism according to the invention may be provided at the second side of the material bed. The first and second powder feed mechanisms may be arranged to operate in tandem, e.g. in an alternating manner, to provide build material for the material bed. This may improve the print speed and quality.

Moreover, by disposing powder chambers on opposite sides of the material bed, excess powder from the spreading operation is automatically recycled into a location where it can be re-used in a powder feed operation. No additional extraction apparatus may be required. Each powder chamber may have a filter element (e.g. a sieve) mounted to receive the excess powder. The filter element may be mounted over the powder chamber in a position behind the powder support surface when in the powder delivery position. The powder support surface may be held in this position during spreading of powder from the opposite powder chamber, so that the excess powder is pushed over the powder support surface and into the filter element. The powder support surface may thus prevent excess powder from dropping directly into the powder chamber. The filter element may be arranged to ensure that no agglomerates enter the powder chamber. The filter element may be vibrated to facilitate passing of the powder.

The printer may treat the spread layer in any conventional manner, e.g. using heat treatment (e.g. a laser or other heat source arranged to generate thermal energy for heat-treating a selectable area of powder in the layer spread on the material bed) or physical bonding. In one embodiment, the heat source may comprise a thermal head movable relative to the material bed over the layer spread on the material bed, wherein the thermal head comprises an array of selectively activatable heating elements arranged to transfer thermal energy by conduction.

BRIEF DESCRIPTION OF THE DRAWINGS

Detailed embodiments of the invention are discussed below with reference to the accompanying drawings, in which.

DETAILED DESCRIPTION; FURTHER OPTIONS AND PREFERENCES

Figure 1:
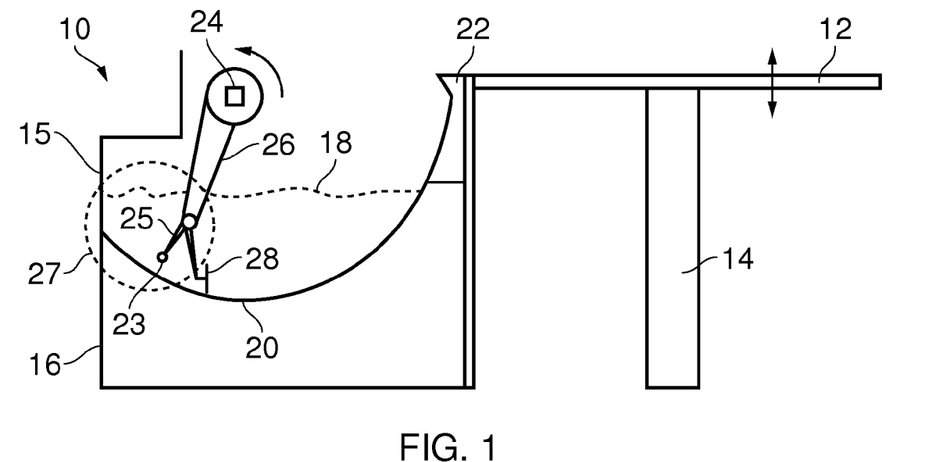
FIG. 1 is a schematic cross-sectional side view of a powder feed mechanism that is an embodiment of the invention, where the carrier arm is in a powder capture position.

FIG. 1 shows a schematic cross-sectional view of a powder feed mechanism 10 for a three-dimensional printer. In FIG. 1 only the material bed 12 of the three-dimensional printer is shown; the frame and other components are omitted for clarity. As is conventional, the material bed 12 is arranged to move up and down to permit sequential layers of build material to be deposited thereon. In this embodiment the material bed 12 is attached to a shaft 14 which is movable up and down e.g. by a stepper motor or the like (not shown).

The powder feed mechanism 10 comprises a powder chamber 15 mounted against a first side of the material bed 12. In this embodiment, the powder chamber 15 is part of the lower housing 16 of the printer. The powder chamber 15 is a receptacle for holding flowable build material, such as powder. A fill level for the powdered build material is shown by dotted line 18 in FIG. 1. Suitable powder for use with the present invention may include polyamides, polypropylene, polystyrene and mixture thereof.

The powder chamber 15 has a curved bottom surface 20, which extends from the back of the powder chamber 15 to a top edge 22 of at the front of the powder chamber 15. The bottom surface has a concave profile between these points. The top edge 22 is in line with the material bed. As explained in detail below, the powder feed mechanism operates to push powder up from the powder chamber to protrude above the top edge 22, from where it can be pushed by a spreading blade or the like into a deposited layer on the material bed 12.

The powder feed mechanism 10 includes a rotatable shaft 24 mounted over the powder chamber. The rotatable shaft 24 is connected to a bi-directional drive means (not shown), such as a DC gear motor with two endstop microswitches, which is arranged to rotate the shaft both clockwise and anticlockwise about a horizontal axis which lies approximately level with and parallel to the top edge 22 of the powder chamber 15.

A carrier arm 26 is mounted on the rotatable shaft 24. The carrier arm 26 extends away from the rotatable shaft 24 in a radial direction such that it swings through the powder chamber 15 when the rotatable shaft 24 is rotated. FIG. 1 shows the carrier arm 26 in a powder capture position near the beginning of an upstroke. In this position the carrier arm 26 extends downwards into the pile of build material.

A support platform 28 is attached at an end of the carrier arm 26 distal to the rotatable shaft 24. The support platform 28 comprises an elongate slat which lies across the interior of the build channel parallel to the axis of rotation of the rotatable shaft 24. The support platform 28 includes a flat powder support surface which, during an upstroke, is orientated to face in the direction of travel, i.e. the plane of the powder support surface lies substantially orthogonal to the direction of travel.

The length of the carrier arm 26 is arranged so that the distal edge of the support platform 28 contacts and slides against a lower section 30 of the bottom surface 20 of the powder chamber 15. Thus, during an upstroke, the powder build material is pushed by the powder support surface of the support platform 28 upwards against the lower section 30 of the bottom surface 20. Powder therefore accumulates on the powder support surface.

A powder manipulator is mounted on the carrier arm behind the support platform 28 in the upstroke direction. In this embodiment, the powder manipulator comprises a taut transversely extending wire or rod 23 mounted on the carrier arm via a frame 25. The wire 23 functions to disturb powder in a "dead zone" of the powder chamber 15, which is a region 27 located behind the support platform 28 when the carrier arm 26 is in the powder capture position. Disturbing the powder in this way can encourage it to fall forwards along a forwardly tilted section of the bottom surface 20 into a central region where it is accessible for the support platform 28.

Figure 2:
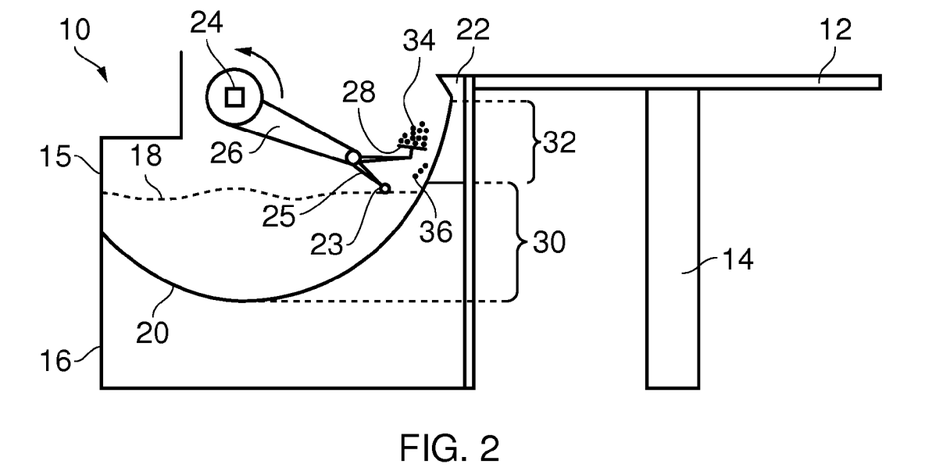
FIG. 2 is a schematic cross-sectional side view of the powder feed mechanism shown in FIG. 1, where the carrier arm is between the powder capture position and a powder delivery position in a upstroke movement.

FIG. 2 shows the same features as FIG. 1 later in the upstroke movement of the carrier arm 26. In this view, the carrier arm 26 and support platform 28 have clear the pile of powdered build material in the powder chamber 15. The arc-like path of the support platform 28 is such that the powder support surface thereof is nearing a horizontal orientation. Accordingly, when the platform exits from the pile of powder, a heap 34 of accumulated powder is carried thereon. At this stage, the support platform 28 begins to move past an upper section 32 of the bottom surface 20 of the powder chamber 15. The profile of the bottom surface in the upper section 32 is arranged to be spaced from the distal end of the support platform 28. This leaves a run off gap between the powder support surface of the support platform 28 and the bottom surface 20 of the powder chamber, through which excess powder 36 from the heap 34 on the support platform may return to the pile.

Figure 3:
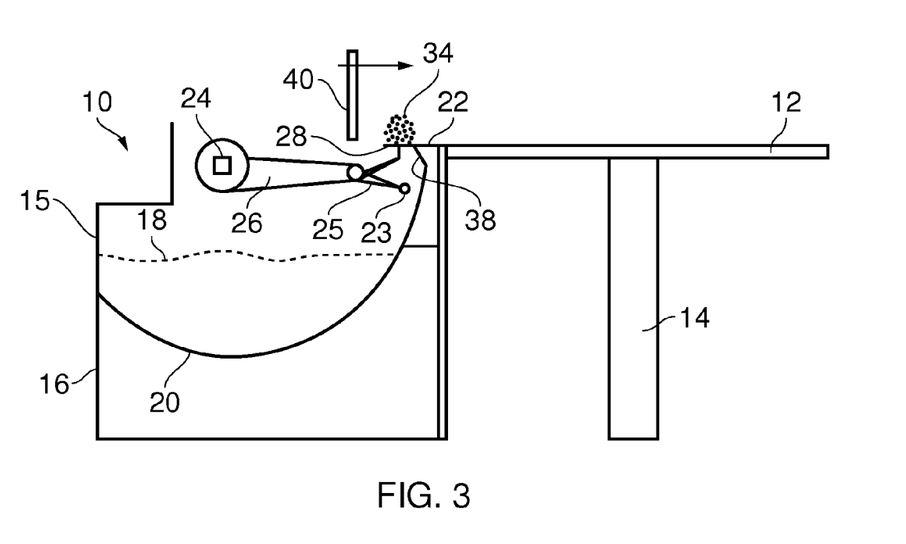
FIG. 3 is a schematic cross-sectional side view of the powder feed mechanism shown in FIG. 1, where the carrier arm is in the powder delivery position.

FIG. 3 shows the same features as FIG. 1 at the end of the upstroke movement of the carrier arm 26, at which the carrier arm 26 occupies a powder delivery position. In this embodiment the carrier arm 26 lies in a transverse (e.g. horizontal) orientation in this position. The support platform 28 meanwhile is brought level with the top surface of the material bed 12, and the powder support surface is horizontal. The distal end of the support platform 28 is in contact with a lip 38, which extends backwards from the top edge 22 of the powder chamber 15. The lip 38 preferably extends across the whole width of the top edge 22 to provide a line of unbroken contact with the support platform 28. This means that the heap 34 of powder can be pushed from the support platform 28 to the material bed by a spreading device (shown schematically as blade 40 in this embodiment) without losing any powder back into the powder chamber. The powder support surface of the support platform 28 may lie flush with the top edge 22 to prevent powder from becoming trapped in a steps or crevices.

Figure 4:
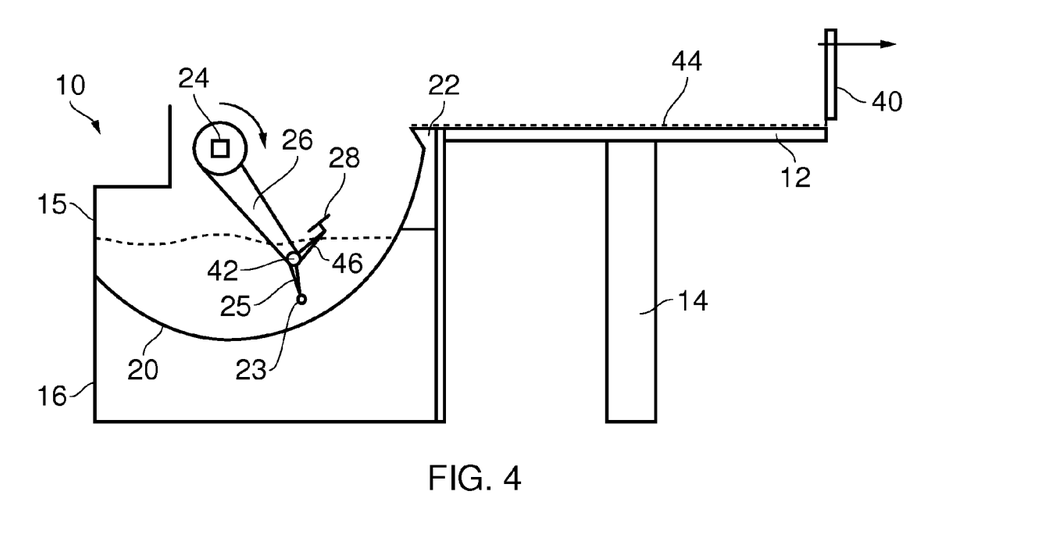
FIG. 4 is a schematic cross-sectional side view of the powder feed mechanism shown in FIG. 1, where the carrier arm is between the powder capture position and the powder delivery position in a downstroke movement.

FIG. 4 shows the same features as FIG. 1 when the carrier arm 26 is part way through a downstroke movement returning from the powder delivery position to the powder capture position. The rotatable shaft 24 turns in the opposite direction during the downstroke movement from the upstroke movement. During the downstroke, the support platform 28 is able to pivot relative to the carrier arm 26. The pivoting action means that force required to move the support platform 28 through the powder is reduced and ensures that the support platform does not push the powder into a "dead zone" beyond the powder capture position during the downstroke movement. In this embodiment, the support platform 28 is connected to a carrier finger 46 which in turn is connected to the carrier arm 26 at a pivot joint 42. The pivot joint 42 can be lockable or physically blocked from permitting rotation of the support platform 28 behind the carrier arm 26 during the upstroke movement, as this could cause the accumulated heap of powder to be lost. In one embodiment, this blocking may be provided by adapting the pivot joint to permit rotation only over a limited range, which is through an angle forward of the carrier arm 26.

The frame 25 is not movable with respect to the carrier arm 26. This means that the wire 23 of the powder manipulator passes through the powder during the downstroke movement. This can facilitate passage of the support platform back to the powder capture position by reducing the resistance the powder exerts against movement of the carrier arm during the downstroke movement.

Meanwhile, the spreading device 40 moves over the material bed 12 to spread the heap 34 of powder into a layer 44 ready for heat treatment in a known manner.

At the end of the downstroke the direction of rotation of the rotatable shaft 24 is switched again to begin another upstroke movement. During the first stage of the upstroke movement, the support platform 28 then encounters resistance from the powder, which rotates the support platform 28 back around the pivot joint 42 relative to the carrier arm 26 until the limit of rotation in reaches, at which point the mechanism has returned to the configuration shown in FIG. 1.

Figure 5:
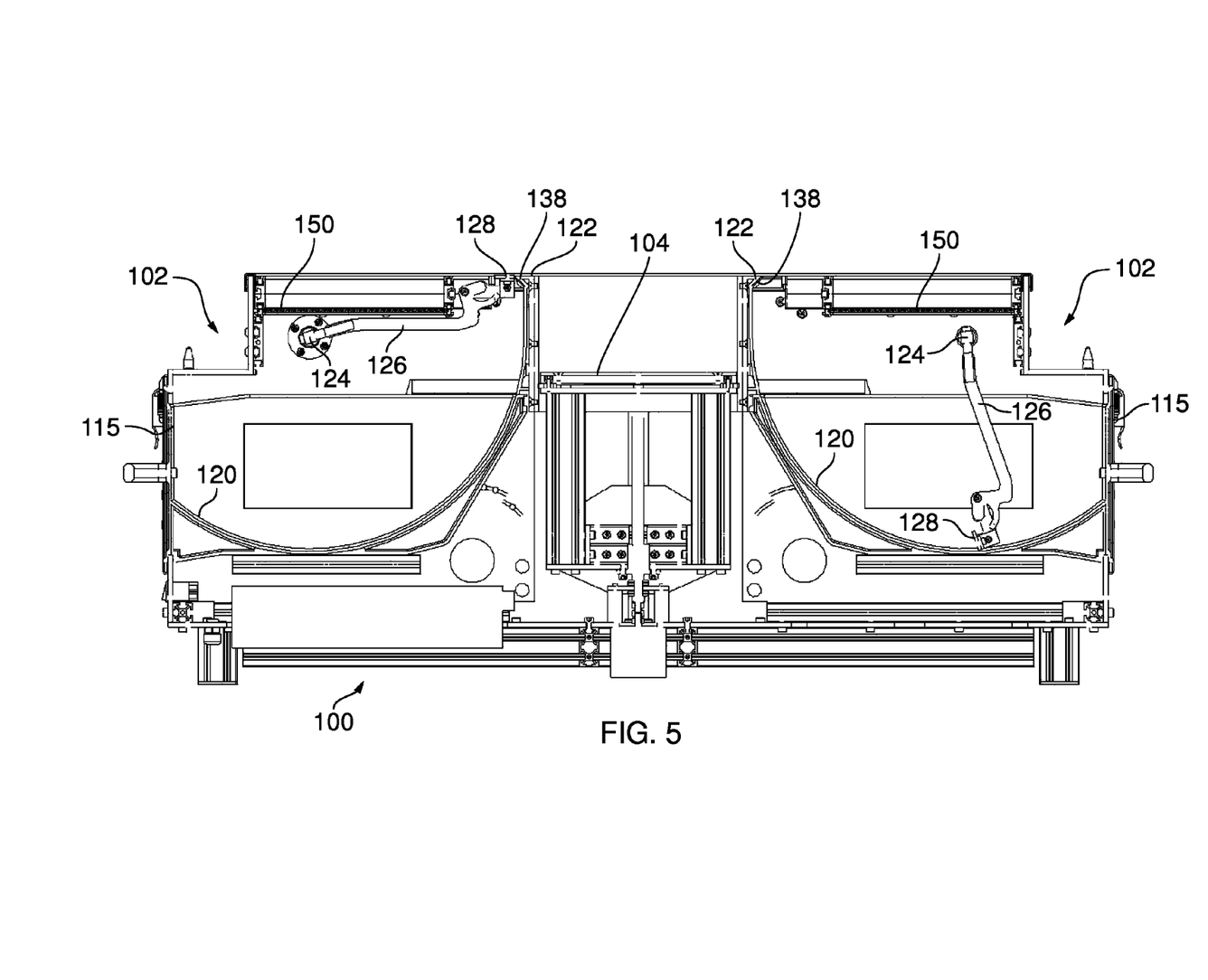
FIG. 5 is a cross-section view through a three-dimensional printer having a pair of powder feed mechanisms that is an embodiment of the invention.

FIG. 5 is a cross-sectional view through a three-dimensional printer according to the invention, which has two powder feed mechanisms 102 on opposite sides of a material bed 104. Each powder feed mechanism 102 has a similar construction to that described above with reference to FIG. 1. There is a powder chamber 115 at each side of the material bed 104. This means that excess powder from a spreading operation can be received into the opposite powder chamber. Each powder chamber 115 has a vibratable sieve 150 mounted over its top surface behind the location where the support platform 128 meets the top edge 122 of the powder chamber 115 next to the material bed 104. Powder recycling occurs automatically at the end of the spreading operation when the excess powder is spread over the opposite support platform 128 (which is maintained in the powder delivery position for this purpose) into the vibratable sieve 150.

Each powder chamber 115 has a concave bottom surface 120 which extends to the top edge 122 of the powder chamber 115 next to the material bed 104. As discussed above, there is an overhanging lip 138 at each top edge 122.

Each powder feed mechanism 102 has a rotatable shaft 124 with a carrier arm 126 extending therefrom in the same way as discussed above. Each carrier arm 126 has a support platform 128 rotatably attached at its distal end.

Figure 6:
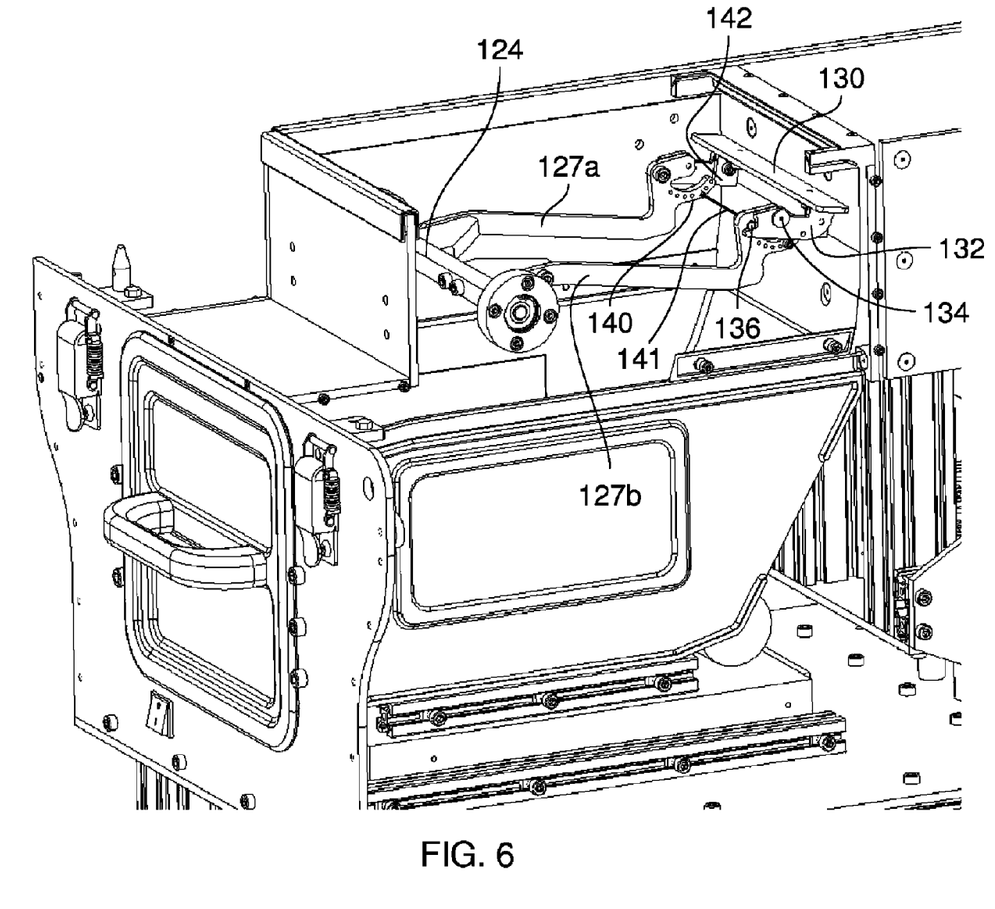
FIG. 6 is a partly cut away perspective view of one of the powder feed mechanisms shown in FIG. 5.
Figure 7:
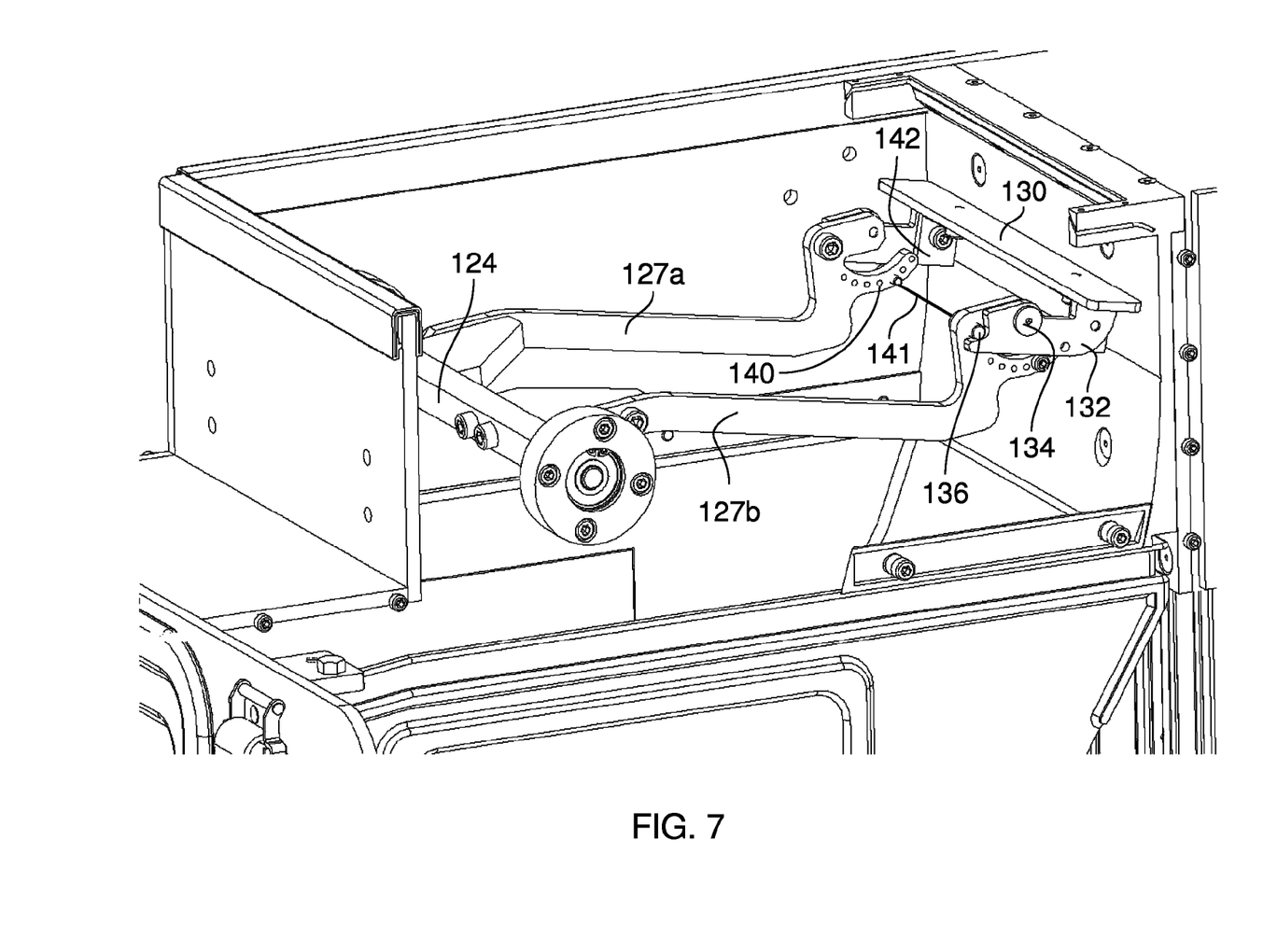
FIG. 7 is a magnified perspective view of the carrier arm and support platform shown in FIG. 6.

FIGS. 6 and 7 show in more detail the construction of the carrier arm 126 and support platform 128 of this embodiment. The vibratable sieve 150 is omitted in these views for clarity. The carrier arm 126 comprises a pair of struts 127a, 127b extending away from the rotatable shaft 124 at opposite ends thereof. The struts 127a, 127b are arranged to have a thin cross-sectional area across the direction of movement to minimise the disturbance they create in the powder. The support platform 128 is an elongate slat 130 that spans the gaps between the struts 127a, 127b. The elongate slat 130 has a pair of L-shaped brackets 132 attached to its underside to connect it to the pair of struts 127, 127b. Each bracket 132 is pivotally connected to its respective strut via a hinge 134. The angle of rotation of each bracket 132 about its respective hinge 134 is limited by a rotation stop 136, which is a protruding abutment element that engages the back surface of the bracket 132. Rotation may also be prevented through engagement between a forward protrusion 140 on each strut and a corresponding abutment element 142 on its respective bracket 132. Each forward protrusion 140 has a number of holes formed therein which act as anchor points for one or more transverse wires (one wire 141 is shown in FIGS. 6 and 7), which perform the function of the powder manipulator discussed above.

The invention claimed is:

1. A powder feed mechanism for transporting powdered build material from a powder chamber to a material bed of a three dimensional printer, the powder feed mechanism comprising:
   a carrier arm rotatable about a first axis to move back and forth through the powder chamber along an arc shaped path between a powder capture position and a powder delivery position; and
   a support platform having a powder support surface to carry a heap of powdered build material, the support platform rotatably attached to the carrier arm to move therewith through the powder chamber between the powder capture position and the powder delivery position and to rotate relative to the carrier arm about a second axis parallel to the first axis.

2. A powder feed mechanism according to claim 1, wherein the powder support surface is flat and when the carrier arm is in the powder delivery position the powder support surface is in a transverse orientation to lie flush with the material bed.

3. A powder feed mechanism according to claim 1, comprising a rotatable shaft that defines the first axis and wherein;
   the carrier arm comprises a pair of struts spaced apart and fixed to the rotatable shaft; and
   the support platform comprises an elongate slat that spans between the struts, the slat rotatably attached to the struts with hinges that define the second axis.

4. A powder feed mechanism according to claim 1, comprising a powder chamber that includes:
   a front wall adjacent to the material bed, the front wall having a top edge for alignment with the top of the material bed and a lip along the top edge abutting the support platform when the carrier arm is in the powder delivery position; and
   a bottom surface that is curved to follow the path of the support platform towards the top edge of the front wall.

5. A powder feed mechanism according to claim 4, wherein the bottom surface comprises a lower section shaped to contact the support platform during a first portion of movement along its path through the powder chamber, and an upper section shaped to be spaced from the support platform during a second portion of movement along its path through the powder chamber.

6. A powder feed mechanism according to claim 1, wherein the support platform is rotatable about the second axis from a transverse orientation when the carrier arm is in the powder delivery position to an angled orientation as the carrier arm moves away from the powder delivery position.

7. A powder feed mechanism according to claim 6 including an abutment element on the carrier arm to block rotation of the orientation of the support platform about the second axis away from the transverse position during an upstroke movement of the carrier arm from the powder capture position to the powder delivery position.

8. A powder feed mechanism according to claim 1 including a wire or rod attached to the carrier arm to disturb powder in the powder chamber behind the support platform when the carrier arm is in the powder capture position.

9. A printer for building a three-dimensional model by sequential deposition of a plurality of cross-sectional layers, the printer comprising:

a material bed;

a powder chamber to hold build powder;

a powder spreading mechanism to spread a heap of powder into a layer over the material bed; and a powder feed mechanism to present the heap of powder to the powder spreading mechanism, the powder feed mechanism including:

a carrier arm rotatable about a first axis to move back and forth through the powder chamber between a powder capture position and a powder delivery position; and a support platform rotatably attached to the carrier arm to move back and forth with the carrier arm through powder in the powder chamber and to rotate about a second axis parallel to the first axis relative to the carrier arm as the support platform moves through powder in the powder chamber.

10. A printer according to claim 9, wherein:

the powder spreading mechanism is operable in both directions between a first side of the material bed and a second side of the material bed opposite to the first side; and the powder feed mechanism includes a first powder feed mechanism at the first side of the material bed and a second powder feed mechanism at the second side of the material bed.

11. A printer according to claim 9 including a powder treatment mechanism to selectively bond powder in the layer spread on the material bed.

12. A printer according to claim 11, wherein the powder treatment mechanism includes a heat source arranged to generate thermal energy for heat-treating a selectable area of powder in the layer spread on the material bed.

* * * * *

UNITED STATES PATENT AND TRADEMARK OFFICE
CERTIFICATE OF CORRECTION

PATENT NO. : 9,738,035 B2  
APPLICATION NO. : 14/428939  
DATED : August 22, 2017  
INVENTOR(S) : Tjellesen et al.

Page 1 of 1

It is certified that error appears in the above-identified patent and that said Letters Patent is hereby corrected as shown below:

On the Title Page

In Item (54) and in the Specification, Column 1, Line 1, Title, delete "POWER" and insert -- POWDER --, therefor.

In the Claims

Column 10, Line 57, Claim 7, delete "the orientation of the support" and insert -- the support --, therefor.

Signed and Sealed this
Eighteenth Day of December, 2018

Andrei Iancu
*Director of the United States Patent and Trademark Office*